US006553711B1

United States Patent
Feng

(10) Patent No.: US 6,553,711 B1
(45) Date of Patent: Apr. 29, 2003

(54) SWITCHABLE MOSQUITO EXPELLING/KILLING DEVICE

(75) Inventor: Hsiu-Mei Feng, Taipei Hsien (TW)

(73) Assignee: Long Well Electronics Corp., Taipei Hsien (TW)

( * ) Notice: Subject to any disclaimer, the term of this patent is extended or adjusted under 35 U.S.C. 154(b) by 0 days.

(21) Appl. No.: 09/697,050

(22) Filed: Oct. 27, 2000

Related U.S. Application Data

(63) Continuation-in-part of application No. 09/532,552, filed on Mar. 22, 2000, now Pat. No. 6,293,044.

(51) Int. Cl.[7] ............................ A01M 13/00; A01M 1/22
(52) U.S. Cl. ..................... 43/129; 43/132.1; 422/125; 367/139; 340/384.2
(58) Field of Search .................... 43/107, 112, 124, 43/132.1, 131, 125, 129; 367/139; 116/22 A; 340/384.2; 392/390, 392; 219/541; 239/34, 53, 60; 320/107, 111, 112, 113, 114, 115

(56) References Cited

U.S. PATENT DOCUMENTS

| | | | | |
|---|---|---|---|---|
| 2,690,500 A | * | 1/1954 | Winberg et al. ............... 392/392 |
| 2,931,880 A | * | 4/1960 | Yaffe ............................ 392/390 |
| 3,348,116 A | * | 10/1967 | Freeman et al. ............... 320/115 |
| 3,666,914 A | * | 5/1972 | Dean ............................ 219/541 |
| 3,778,924 A | * | 12/1973 | Okui ............................ 43/129 |
| 3,891,962 A | * | 6/1975 | White ............................ 367/139 |
| 3,931,865 A | * | 1/1976 | Levitt ............................ 367/139 |
| 4,228,124 A | * | 10/1980 | Kashihara et al. ............... 43/125 |
| 4,228,343 A | * | 10/1980 | Kanner et al. ............... 219/541 |
| 4,467,177 A | * | 8/1984 | Zobele ............................ 392/392 |
| 4,731,520 A | * | 3/1988 | Glucksman et al. ........... 392/392 |
| 4,777,345 A | * | 10/1988 | Manchester .................... 392/390 |
| 4,857,702 A | * | 8/1989 | Cafaro ............................ 320/111 |
| 4,891,904 A | * | 1/1990 | Tabita ............................ 43/129 |
| 5,095,647 A | * | 3/1992 | Zobele et al. .................. 43/125 |
| 5,168,654 A | * | 12/1992 | Chien ............................ 43/129 |
| 5,189,358 A | * | 2/1993 | Tomura et al. ............... 320/115 |
| 5,220,636 A | * | 6/1993 | Chang ............................ 392/392 |

(List continued on next page.)

FOREIGN PATENT DOCUMENTS

| | | | |
|---|---|---|---|
| EP | 498278 B1 | * | 8/1992 |
| EP | 470088 B1 | * | 6/1994 |
| JP | 58-126729 B1 | * | 7/1983 |
| JP | 4-104752 B1 | * | 4/1992 |
| JP | 5-299205 B1 | * | 11/1993 |
| JP | 8-154554 B1 | * | 6/1996 |
| JP | 9-107861 B1 | * | 4/1997 |
| JP | 9-289856 B1 | * | 11/1997 |
| JP | 11-299407 B1 | * | 11/1999 |
| JP | 2001-136890 B1 | * | 5/2001 |

*Primary Examiner*—Darren W. Ark
(74) *Attorney, Agent, or Firm*—Dennison, Schultz & Dougherty

(57) ABSTRACT

Switchable mosquito expelling/killing device including a box body having a clip body for hanging the box body on a user's body. The box body is disposed with a pushing block, an electric mosquito incense mat insertion hole, gas releasing slots, DC socket and a switch. An oscillating circuit and a heater fixing seat, an electric heater and a cell for supplying power are disposed in the box body. The box body can be co-used with a transformer socket to be used indoors. By means of switching the switch outside the box body, the mosquito expelling/killing device can be switched between a mosquito expeller using the oscillating circuit to-generate a sound wave simulating the sound wave of male mosquitoes for expelling fertilized female mosquitoes and an electric mosquito incense device using the electric heater to heat electric mosquito incense mat for releasing mosquito-killing incense to kill the mosquitoes. When co-used with the transformer socket, the device can be converted into an indoors used mosquito expelling/killing device powered by indoor AC power.

3 Claims, 8 Drawing Sheets

U.S. PATENT DOCUMENTS

| | | | | |
|---|---|---|---|---|
| 5,259,062 A | * | 11/1993 | Pelonis | 392/390 |
| 5,282,334 A | * | 2/1994 | Kimura et al. | 43/125 |
| 5,311,697 A | * | 5/1994 | Cavanaugh et al. | 43/107 |
| 5,493,379 A | * | 2/1996 | Kuroda et al. | 219/541 |
| 5,644,866 A | * | 7/1997 | Katsuda et al. | 43/129 |
| 5,659,236 A | * | 8/1997 | Hahn | 320/111 |
| 5,695,692 A | * | 12/1997 | Kennedy | 239/60 |
| 5,746,228 A | * | 5/1998 | Parker | 219/541 |
| 5,796,914 A | * | 8/1998 | Gatzemeyer et al. | 392/390 |
| 5,832,657 A | * | 11/1998 | Jan | 116/22 A |
| 6,130,521 A | * | 10/2000 | Collins et al. | 320/115 |
| 6,141,496 A | * | 10/2000 | Sundberg et al. | 392/390 |
| 6,151,827 A | * | 11/2000 | Smith et al. | 43/129 |
| 6,197,263 B1 | * | 3/2001 | Blount | 422/125 |
| 6,293,044 B1 | * | 9/2001 | Feng | 422/125 |
| 6,314,236 B1 | * | 11/2001 | Taylor | 320/115 |
| 6,392,549 B1 | * | 5/2002 | Wu | 43/129 |

* cited by examiner

SWITCHABLE MOSQUITO EXPELLING/KILLING DEVICE

CROSS-REFERENCE TO RELATED APPLICATION

This application is a Continuation-in-part of U.S. patent application Ser. No. 09/532,552 filed on Mar. 22, 2000 now U.S. Pat. No. 6,293,044.

BACKGROUND OF THE INVENTION

The present invention relates to a portable and switchable mosquito expelling/killing device which can be switched between a mosquito expeller for expelling mosquitoes and an electric mosquito incense device for killing the mosquitoes. The switchable mosquito expelling/killing device is applicable to various outdoor or indoor situations such as camping, mountaineering, etc.

It is known that mosquitoes are harmful insects which bite people and are media of various kinds of infectious diseases such as Japanese encephalitis, dengue fever, malaria, etc. Therefore, it is important to kill the mosquitoes.

In general, the mosquitoes are killed by means of mosquito incense or pesticide. Such measures will result in stimulating odor which is hard to bear. In addition, the above measures are usable indoors. In the case that they are used outdoors, the incense tends to dissipate with wind and the mosquito-killing can be hardly achieved.

In order to improve the stimulating odor produced by the mosquito incense or pesticide, electric mosquito incense device and mosquito expeller have been developed. With respect to the electric mosquito incense device, a heater is used to heat an electric mosquito incense mat so as to release a gas for killing or expelling the mosquitoes. Those mosquitoes which will attack people or animals are female mosquitoes during egg laying period. The female mosquitoes during this period will avoid male mosquitoes. The mosquito expeller employs this principle to generate a sonic wave simulating the sound produced by the male mosquitoes and thus expel the female mosquitoes. The above two measures have sole function and is not convertible according to the external environment or factors. For example, in case the electric mosquito incense mat is exhausted and no spare is available, the electric mosquito incense device will become useless.

The applicant's original U.S. patent application Ser. No. 09/532,552 discloses a switchable mosquito expelling/killing device which can be hung on a user's body and used outdoors. The mosquito expelling/killing device is used with an electric mosquito incense mat having fixed thickness. Therefore, it is necessary to manufacture various mosquito expelling/killing devices in accordance with the varied thickness of different types of mosquito incense mats. Moreover, such mosquito expelling/killing device is designed for outdoor use. When used indoors, it is necessary to frequently replace the cells. This leads to waste of resource.

Therefore, it is necessary to provide a portable and switchable mosquito expelling/killing device which can be switched between a mosquito expeller for expelling mosquitoes and an electric mosquito incense device for killing the mosquitoes. The mosquito expelling/killing device can be used with various electric mosquito incense mats with different thickness. Moreover, when used indoors, the mosquito expelling/killing device can be co-used with a transformer socket and powered by indoor AC power so as to save the power of the cells.

SUMMARY OF THE INVENTION

It is therefore a primary object of the present invention to provide a switchable mosquito expelling/killing device which has simple structure and can be easily carried.

It is a further object of the present invention to provide the above switchable mosquito expelling/killing device which can be switched between a mosquito expeller and an electric mosquito incense device in accordance with environmental factors.

It is still a further object of the present invention to provide the above switchable mosquito expelling/killing device which is able to protect a user from being bitten by mosquitoes.

It is still a further object of the present invention to provide the above switchable mosquito expelling/killing device which can be converted into an indoors used mosquito expelling/killing device powered by indoor AC power.

According to the above objects, the switchable mosquito expelling/killing device of the present invention includes a box body having a clip body for hanging the box body on a user's body. The box body is disposed with a pushing block, an electric mosquito incense mat insertion hole, gas releasing slots, DC socket and a switch. An oscillating circuit and a heater fixing seat, an electric heater and a cell for supplying power are disposed in the box body. The box body can be co-used with a transformer socket to be used indoors. By means of switching the switch outside the box body, the mosquito expelling/killing device can be switched between a mosquito expeller using the oscillating circuit to generate a sound wave simulating the sound wave of male mosquitoes for expelling fertilized female mosquitoes and an electric mosquito incense device using the electric heater to heat electric mosquito incense mat for releasing mosquito-killing incense to kill the mosquitoes. When co-used with the transformer socket, the device can be converted into an indoors used mosquito expelling/killing device powered by indoor AC power.

The present invention can be best understood through the following description and accompanying drawings wherein:

DETAILED DESCRIPTION OF THE PREFERRED EMBODIMENTS

Figure 1:
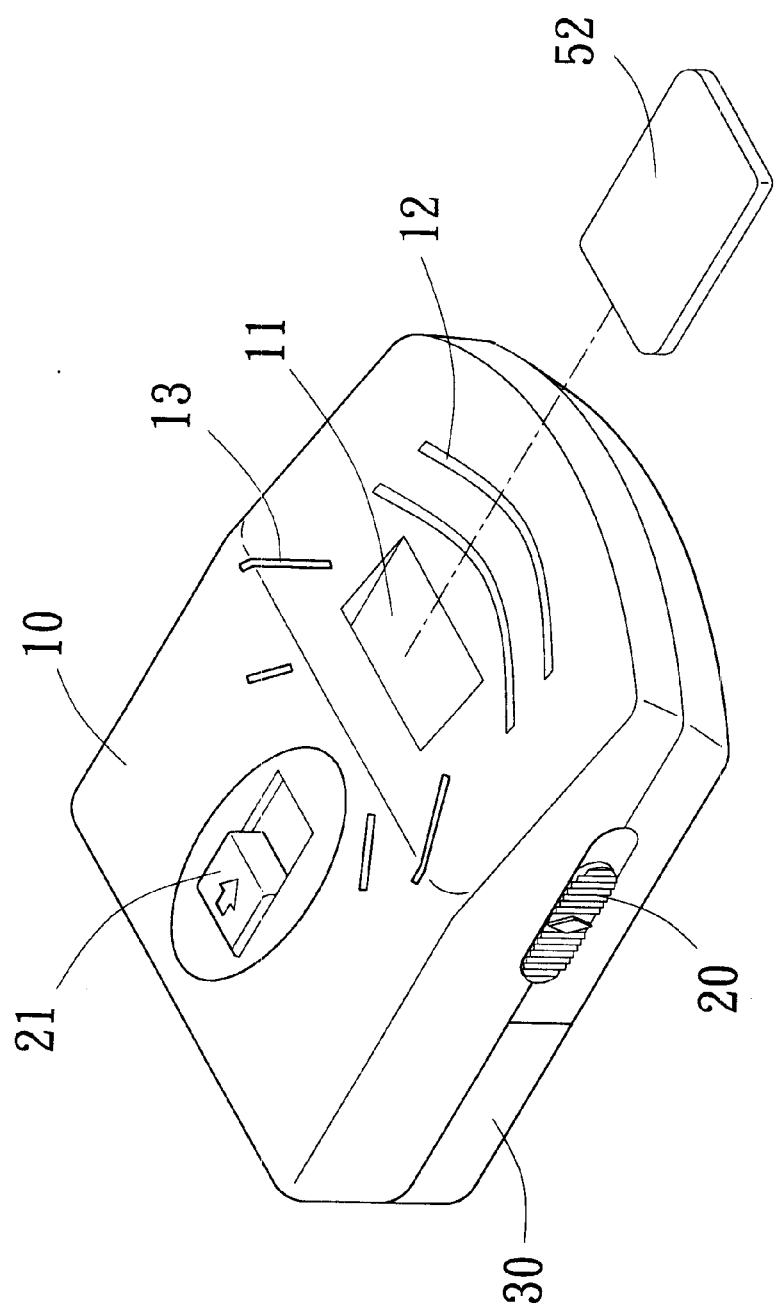
FIG. 1 is a perspective assembled view of the present invention.
Figure 2:
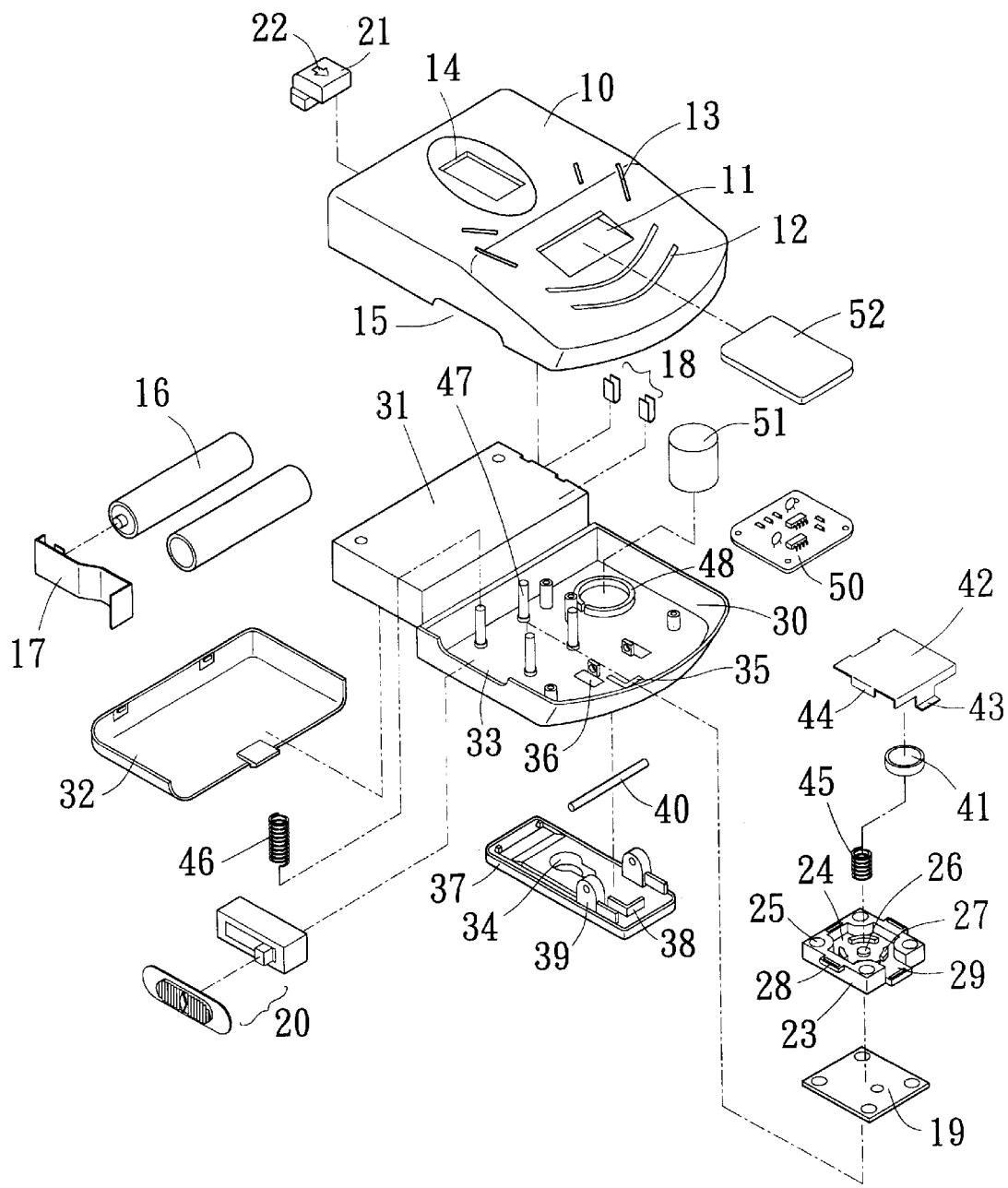
FIG. 2 is a perspective exploded view of the present invention.

Please refer to FIGS. 1 and 2. The present invention includes a box body with a certain size. The front face of the box body is formed with an insertion hole 11 and multiple gas releasing perforations 12, 13. A lateral side of the box body is disposed with a switch 20. The back face of the box body is equipped with a back clip 37. An oscillating circuit 50 and an electric heater 41 are mounted in the box body.

The box body is formed by an upper casing 10 and a bottom casing 30 mated with each other. The surface of the upper casing 10 is formed with a slope section extending from middle portion to the bottom edge. The bottom edge of the slope section is formed with two elongated arched gas releasing slots 12. An insertion hole 11 is formed on upper side of the gas releasing slots 12. The lateral sides of the insertion hole 11 are additionally formed with multiple shorter gas releasing perforations 13. The center of the upper half of the upper casing 10 is formed with a mat pushing hole 14 perpendicular to the insertion hole. A pushing block 21 having an index mark 22 is slidably disposed in the mat pushing hole 14. The top side of the upper casing is disposed with two flanges (not shown) for engaging with a cell cover 32. A lateral side of the upper casing is formed with a switch hole 15 in which the switch 23 is disposed. Four inner corners of the upper casing are respectively disposed with four thread posts with a certain length.

The upper half of the bottom casing 30 is formed with a cell chamber 31 in which a cell 16 is placed. Two ends of the cell chamber 31 are respectively disposed with a positive electrode 17 and a negative electrode 18. The middle lower edge of the lower half of the bottom casing 30 is formed with an insertion slot 35 and a shaft hole 36, whereby a back clip 37 having an engaging hole 34, an insertion block 38 and a lug block 39 is pivotally connected to the back face of the bottom casing 30 via a shaft pin 40. A lateral side of the bottom casing is formed with a switch hole 33. In addition, the four corners of the bottom casing 30 are disposed with thread hole and thread posts for mating with the upper casing 10. The bottom casing 30 is divided into a left and a right sides. The four corners of the left side are respectively disposed with longer projecting posts 47. A spring 46 is fitted around each of the projecting posts 47. A middle upper portion of the right side is disposed with an annular flange 48 and multiple thread posts. The center of the bottom casing is additionally disposed with several thread posts and projecting posts for locking with a heater fixing seat 23, a buzzer 51, an oscillating circuit 50 and the upper casing 10.

The heater fixing seat 23 is a rectangular body. The center of the body is formed with a cavity 24 and the four corners of the body are disposed with through holes 25. A central projecting post 26 is disposed in the cavity 24. Arch ribs 27 are disposed around the central projecting post 26. A small through hole 270 is formed between two arch ribs 27. The middle of each of four sides of the heater fixing seat 23 is disposed with an insertion socket 28 having an insertion hole. One of the four sides is formed with a split 29 and the insertion socket 28 is formed on the bottom edge of the fixing seat 23. A spring 45 is engaged between the central projecting post 26 and the arch ribs 27. A wire is passed through the small through hole 270 between the arch ribs 27 to connect with the spring 45 and then connect with the negative electrode 18 to serve as a negative electrode. An electric heater 41 is disposed on the spring 45. Via a positive copper plate 42 having peripheral engaging bent plate 43 and insertion plate 44, the electric heater 41 inlaid in the heater fixing seat 23. The positive copper plate 42 then via a wire is connected to the positive electrode 17 to form a complete heating circuit.

Figure 3:
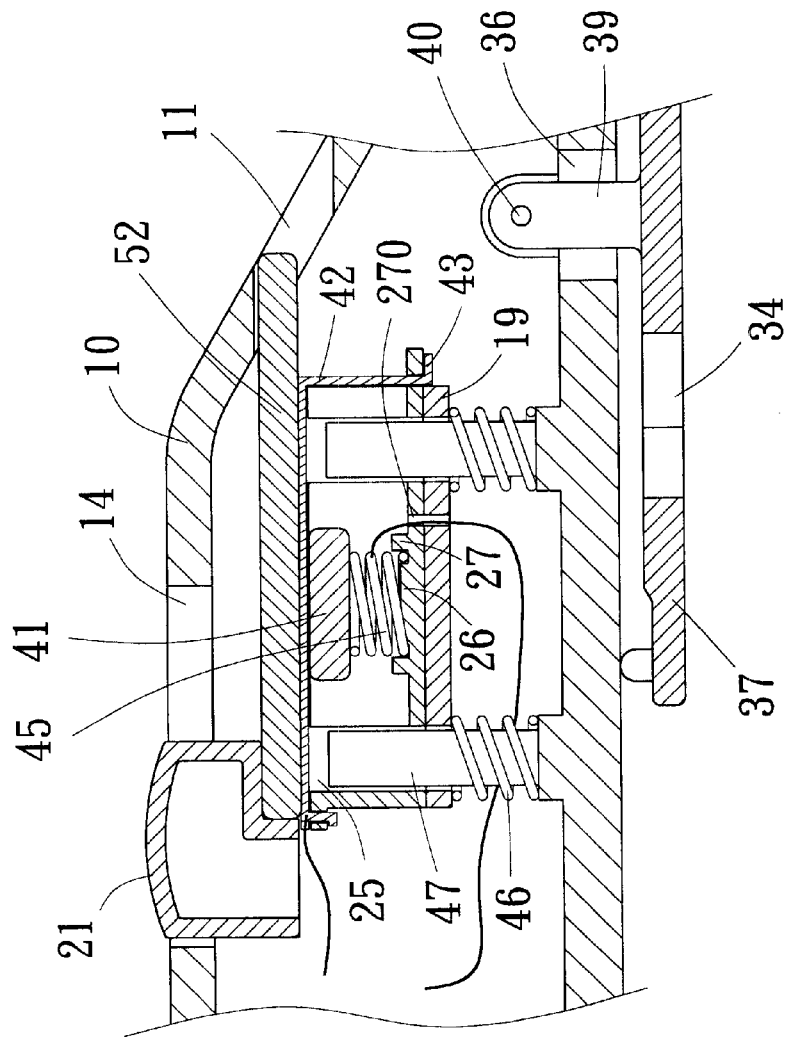
FIG. 3 is a sectional view of a part of the present invention.

Referring to FIG. 3, the pad body 19 is placed on the bottom of the fixing seat 23. By means of the through holes 25, the pad body 19 is fitted on the projecting posts 47 fitted with springs 46 and disposed on left side of the bottom casing 30. Then the upper casing 10 locked thereon by screws to complete the assembly. The electric mosquito incense mat 52 is inserted into the insertion hole 11. The spring 46 on the projecting post 47 serves to upward push the fixing seat 23 to make the electric mosquito incense mat 52 lean against the bottom edge of the positive copper plate 42 and the pushing block 21 and the insertion hole 11 and prevent the electric mosquito incense mat from dropping from the insertion hole 11. No matter how thick the electric mosquito incense mat is, the electric mosquito incense mat can be used. Moreover, the spring 45 in the fixing seat 23 serves to make the heater 41 tightly abut against the positive copper plate 42. Therefore, the heat of the heater 41 can be conducted to the positive copper plate 42 with large area so that the electric mosquito incense mat can be evenly heated.

Figure 4:
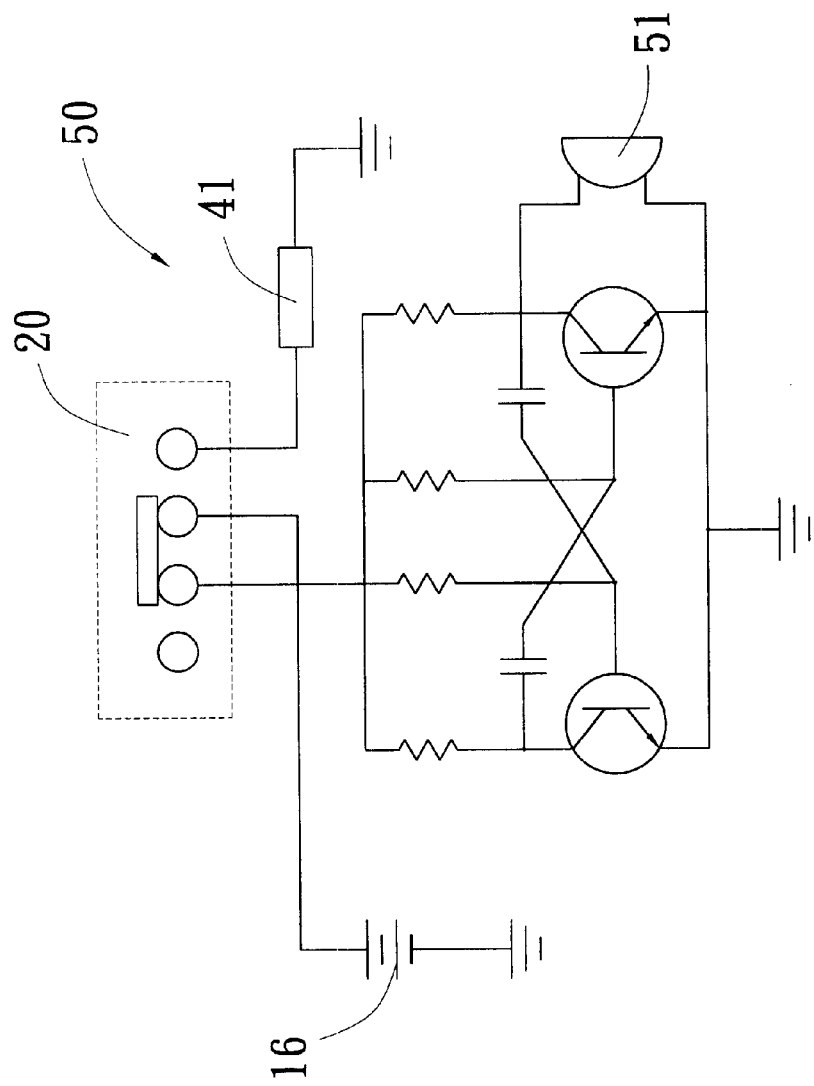
FIG. 4 is a circuit diagram of the present invention.
Figure 5:
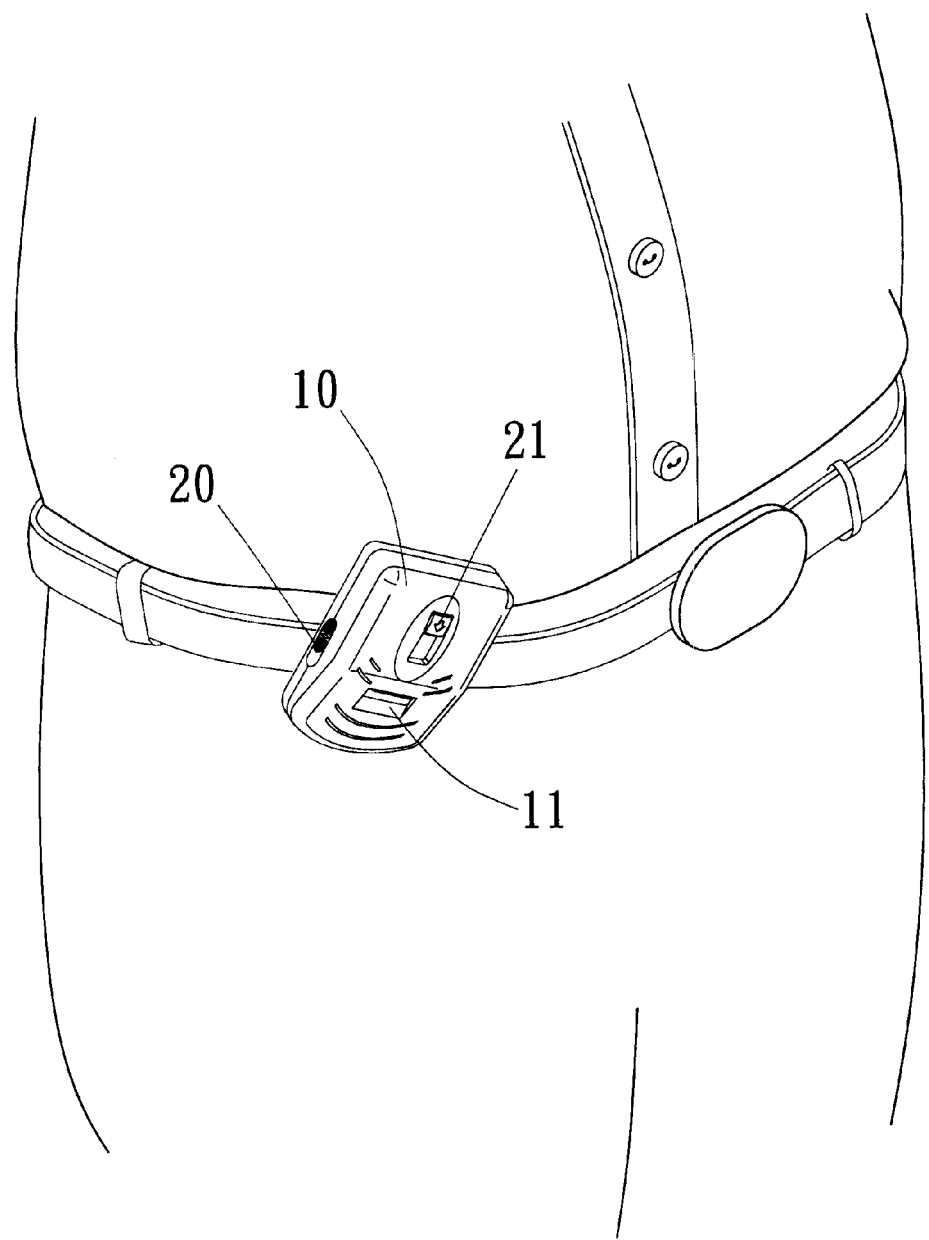
FIG. 5 shows the application of the present invention.

Please refer to FIG. 5. When used outdoors, the present invention can be used with two options in accordance with the conditions:

1. The switch 20 is shifted to a first stage to close the oscillating circuit 50 which is a second-grade amplifying circuit composed of four resistors R1, R2, R3, R4, two capacitors C1, C2, two transistors Q1, Q2 and a buzzer B2 51. By means of supplying d-c power, the output of the first grade is sent to the second grade and a part of the amplified second-grade output is fed back to the first grade, while the other part of the output drives the buzzer 51. At this time, the buzzer 51 generates a sonic wave for expelling the mosquitoes as shown in FIG. 4.
2. The switch 20 is shifted to the second stage, whereby the electric heater 41 is heated. At this time, an electric mosquito incense mat 52 can be inserted into the insertion hole 11 to contact with the positive copper plate 42 of the electric heater 41. Under such circumstance, the electric mosquito incense mat 52 is heated to release the mosquito-killing incense from the gas releasing slots 12, 13 so as to kill the mosquitoes.

A color-changing paper can be attached to the index mark 22 of the pushing block 21. The color of the color-changing paper is varied with the change of the temperature so that a user can clearly know whether the electric mosquito incense device is activated. When the electric mosquito incense mat loses its effect, by means of the pushing block, the mat is pushed downward out of the insertion hole 11 and a new one can be directly and conveniently inserted into the insertion hole 11.

Figure 6:
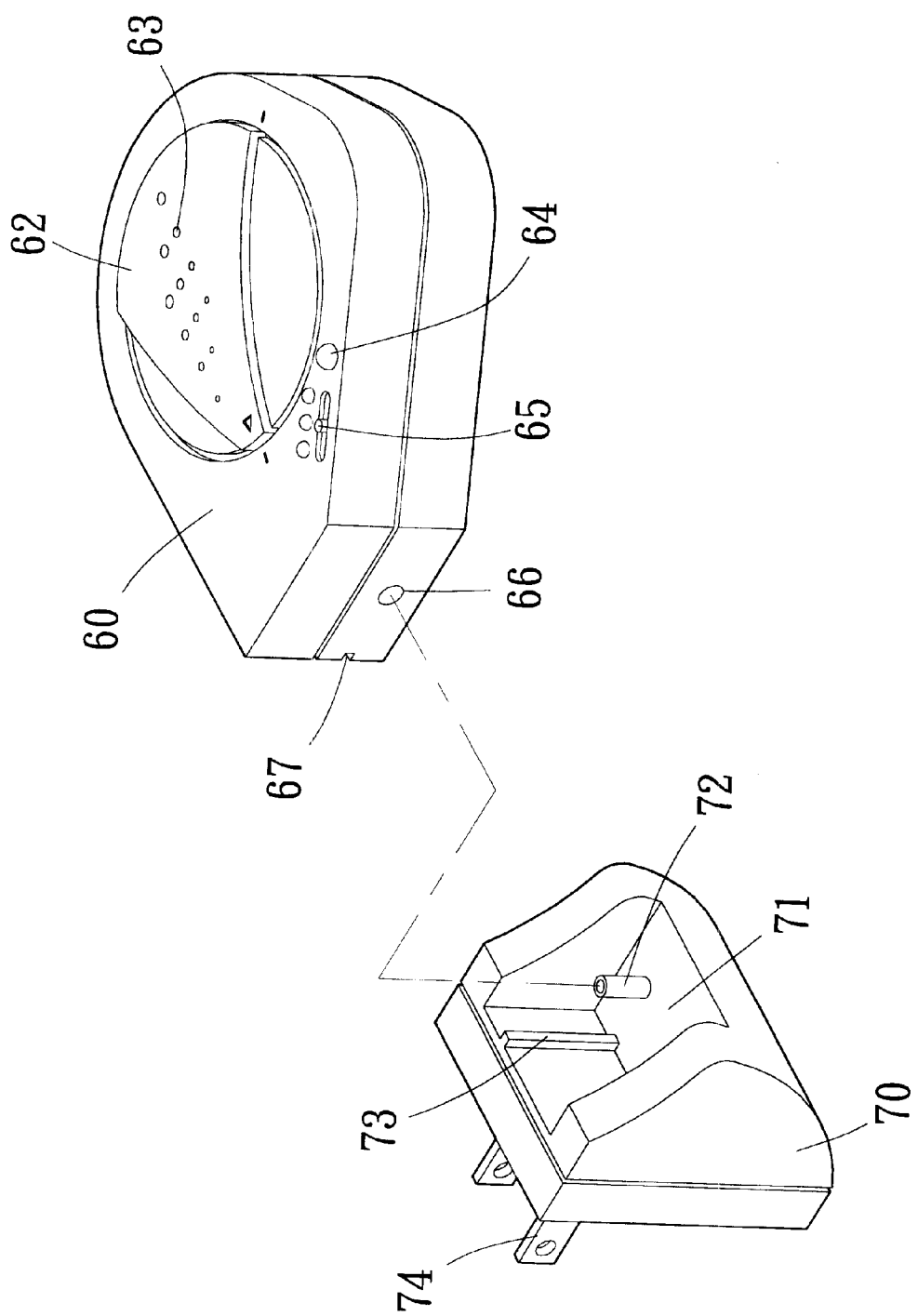
FIG. 6 is a perspective assembled view of a second embodiment of the present invention.
Figure 7:
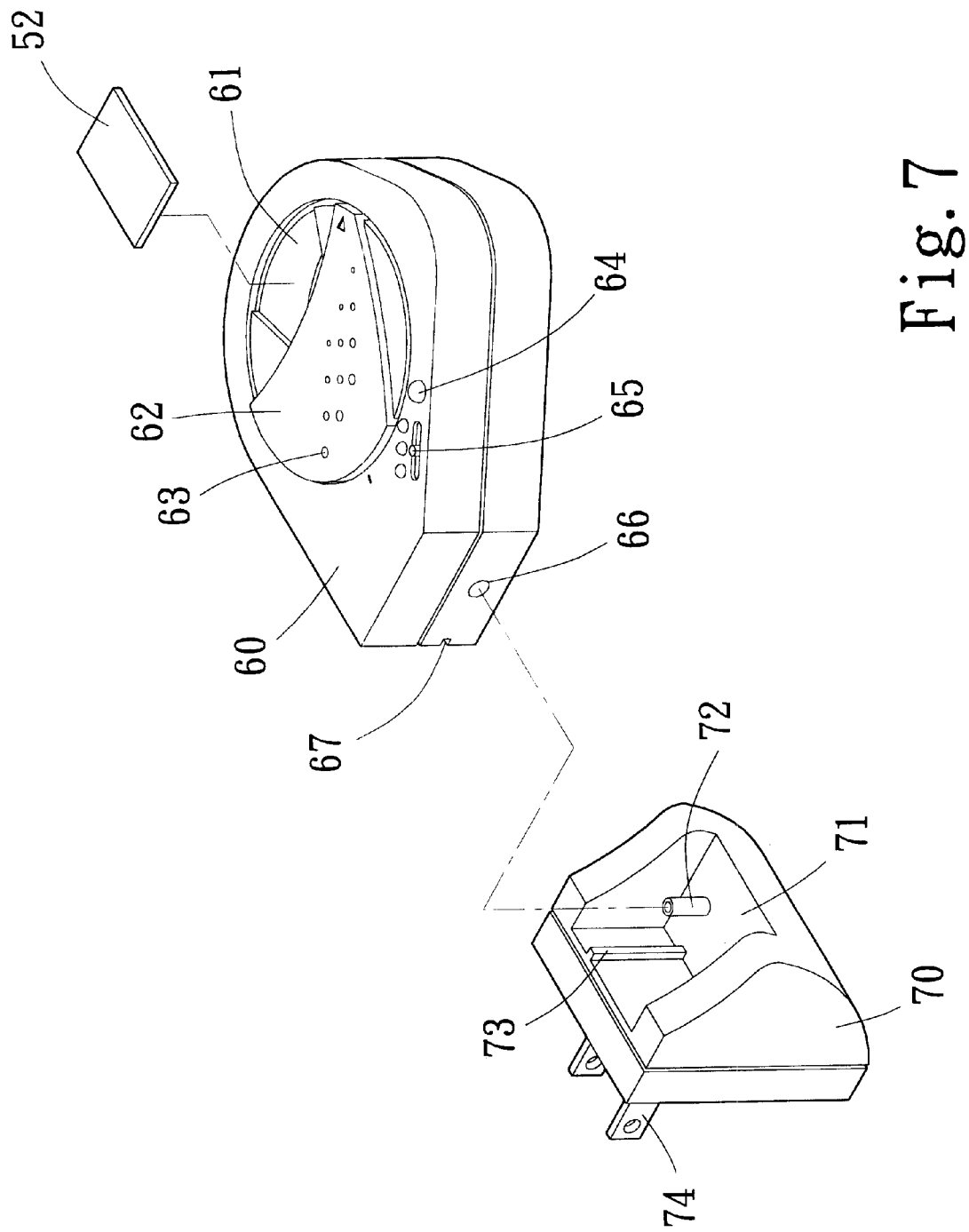
FIGS. 7 and 8 show the application of the second embodiment of the present invention.
Figure 8:
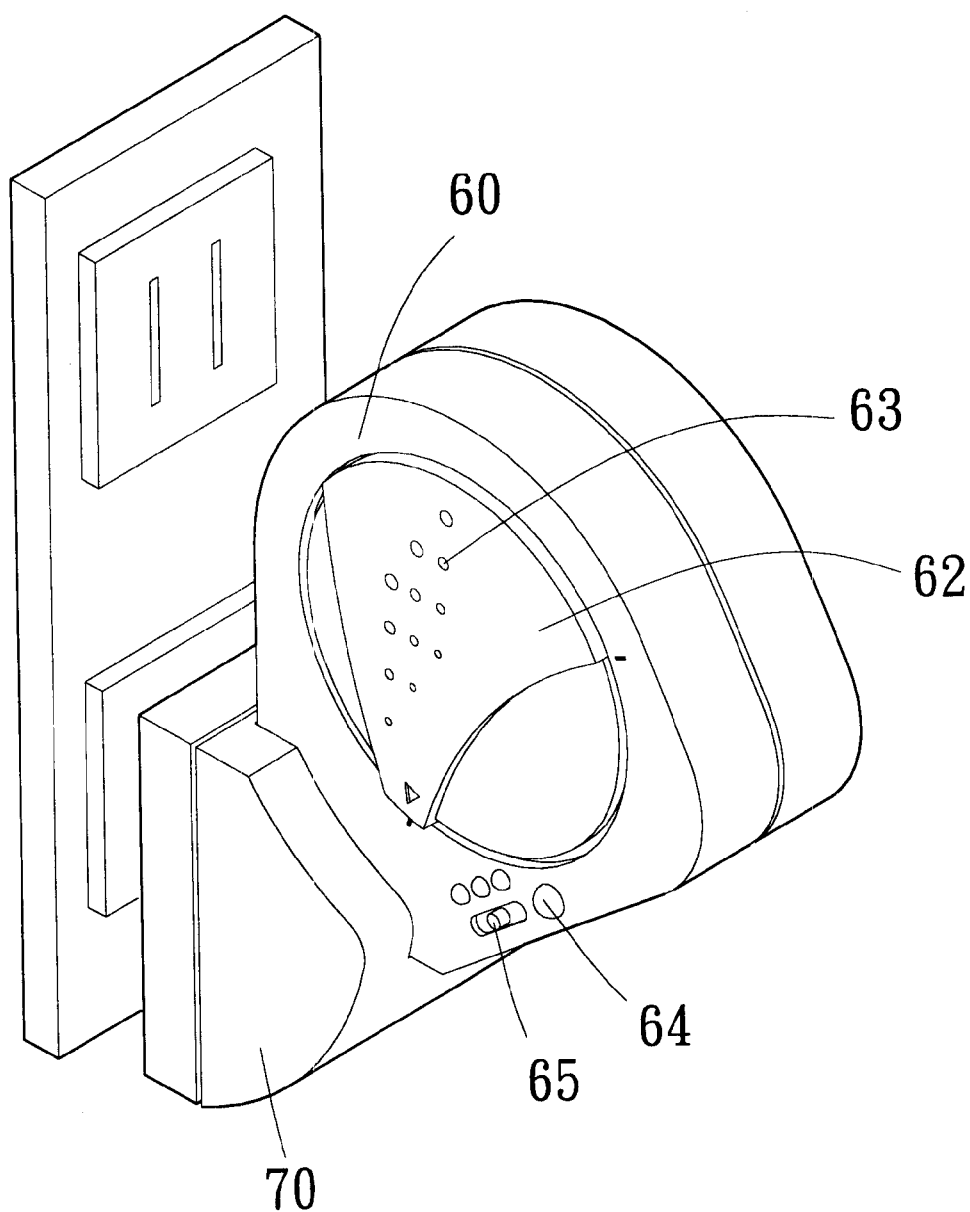

FIGS. 6 to 8 show a second embodiment of the present invention, which is composed of a box body 60 and a transformer socket 70. The box body 60 is formed with an insertion hole 61 and a rotary cover 62 is disposed above the insertion hole 61. The rotary cover 62 is formed with multiple vents 63. Several indicating lamps 64 and a switch 65 are disposed beside the rotary cover 62. One side of the box body 60 is disposed with a DC socket 66 and a guide channel 67. An oscillating circuit 50 and an electric heater 41 are disposed in the box body. A clip (not shown) is mounted on the back face of the box body. Copper insertion plates 74 are disposed on the bottom of the transformer socket 70 to be inserted into a power socket. The upper side of front face of the transformer socket 70 is formed with an insertion cavity 71 in which a DC plug 72 is disposed. A guide rail 73 is formed on a side wall of the transformer socket 70 in parallel to the DC plug 72.

The second embodiment is used outdoors in a manner as the first embodiment. When used indoors, the end of the box body 60 formed with the guide channel 67 and the DC socket 66 is inserted into the insertion cavity 71 of the transformer socket 70. The guide rail 73 formed on the side wall of the insertion cavity 71 is fitted into the guide channel 67 of the box body 60 and the DC plug 72 is plugged into the DC socket 66. The copper insertion plates 74 of the transformer socket 70 are directly inserted into an indoor power socket. Therefore, the circuit originally powered by cells can be powered by indoor AC power supply. Accordingly, the device can be conveniently selectively used indoors or outdoors. The rotary cover 62 can totally cover the insertion hole 61 so as to prevent the electric mosquito incense mat 52 and the heater from being exposed to outer side and ensure safety in use.

According to the above arrangement, the present invention has double mosquito expelling/killing functions which are switchable to expel mosquitoes by way of sound wave or kill mosquitoes by electric mosquito incense.

The above embodiments are only used to illustrate the present invention, not intended to limit the scope thereof. Many modifications of the above embodiments can be made without departing from the spirit of the present invention.

What is claimed is:

1. A switchable mosquito expelling/killing device comprising a box body having a bottom, an electric mosquito incense mat insertion hole, a switch, a cell chamber and a transformer socket, the electric mosquito incense mat insertion hole being formed at a center of a top face of the box body, the switch being disposed on one side of the box body, the cell chamber being formed on a rear half of the box body, said device being characterized in that:

a heater fixing seat is disposed in the box body opposite to the insertion hole, four corners of the heater fixing seat being supported by projecting posts and springs fitted therearound disposed on the bottom of the box body, a positive copper plate, and the springs resiliently supporting and pushing the positive copper plate disposed on the heater fixing seat to make the positive copper plate tightly touch an electric mosquito incense mat inserted in the electric mosquito incense mat insertion hole;

an oscillating circuit is disposed on one side of the bottom of the box body, a buzzer being disposed beside the oscillating circuit and connected with the oscillating circuit and controlled thereby; and the box body can be inserted into the transformer socket which is plugged into an indoor power socket for indoor use.

2. The switchable mosquito expelling/killing device as claimed in claim 1, wherein the oscillating circuit is a second-grade amplifying circuit composed of four resistors, two capacitors and two transistors, whereby the second-grade output of the oscillating circuit drives the buzzer.

3. The switchable mosquito expelling/killing device as claimed in claim 1, wherein the heater fixing seat is a rectangular body made of bakelite, a center of the rectangular body being formed with a cavity in which a heater is positioned and four corners of the rectangular body being disposed with through holes, the middle of each of the four sides of the rectangular body being formed with an insertion socket having an insertion hole.

* * * * *